United States Patent
Mack et al.

(10) Patent No.: US 7,579,292 B2
(45) Date of Patent: Aug. 25, 2009

(54) OPEN-WORK KNITTED TEXTILE RESIN INFUSION MEDIUM AND REINFORCING COMPOSITE LAMINA

(75) Inventors: Patrick E. Mack, Milford, MA (US); Matthew Ogden, Ayr (GB)

(73) Assignee: VRAC, LLC, Plymouth, MA (US)

( * ) Notice: Subject to any disclaimer, the term of this patent is extended or adjusted under 35 U.S.C. 154(b) by 0 days.

(21) Appl. No.: 11/109,403

(22) Filed: Apr. 19, 2005

(65) Prior Publication Data
US 2006/0035546 A1 Feb. 16, 2006

Related U.S. Application Data

(63) Continuation-in-part of application No. 10/914,931, filed on Aug. 10, 2004.

(60) Provisional application No. 60/493,639, filed on Aug. 11, 2003.

(51) Int. Cl.
*D04B 21/10* (2006.01)

(52) U.S. Cl. .................. 442/312; 442/304; 442/313; 442/314; 442/318; 442/319

(58) Field of Classification Search .............. 442/304, 442/312, 313, 314, 318, 319
See application file for complete search history.

(56) References Cited

U.S. PATENT DOCUMENTS

| | | | | |
|---|---|---|---|---|
| 3,020,173 A | * | 1/1962 | Stieffenhofer | 427/258 |
| 3,763,640 A | * | 10/1973 | Nagel et al. | 57/6 |
| 4,563,382 A | * | 1/1986 | Viel | 42/19 |
| 6,399,189 B1 | * | 6/2002 | Kobayashi et al. | 428/316.6 |
| 7,087,296 B2 | * | 8/2006 | Porter | 428/223 |
| 2003/0077965 A1 | * | 4/2003 | Mack et al. | 442/180 |
| 2003/0102604 A1 | * | 6/2003 | Mack et al. | 264/511 |

OTHER PUBLICATIONS

"Knop yarn" Texmachinery Textile Dictionary, http://www.texmachinery.com/textile_world.php?id_word=2560.*
"Knop stitch" Texmachinery Textile Dictionary, http://www.texmachinery.com/textile_world.php?id_word=2559.*
"Knop" Answers.com, http://www.answers.com/knop.*
"Boss" Answers.com, http://answers.com/boss?cat=health.*

* cited by examiner

*Primary Examiner*—Andrew T Piziali
(74) *Attorney, Agent, or Firm*—Brian M. Dingman; Mirick, O'Connell, DeMallie & Lougee, LLP

(57) ABSTRACT

Resin infusion medium and reinforcing composite lamina textile constituted by a warp knit open work structure produced in the form of polygons of which at least some of the edges are defined by knops such as to give prominence to the design to provide for fluidic channels, the knops being knitted to be sufficiently non-compressible in order to resist collapse of the fluid channels during compression of the composite preform under vacuum induced process pressure.

20 Claims, 5 Drawing Sheets

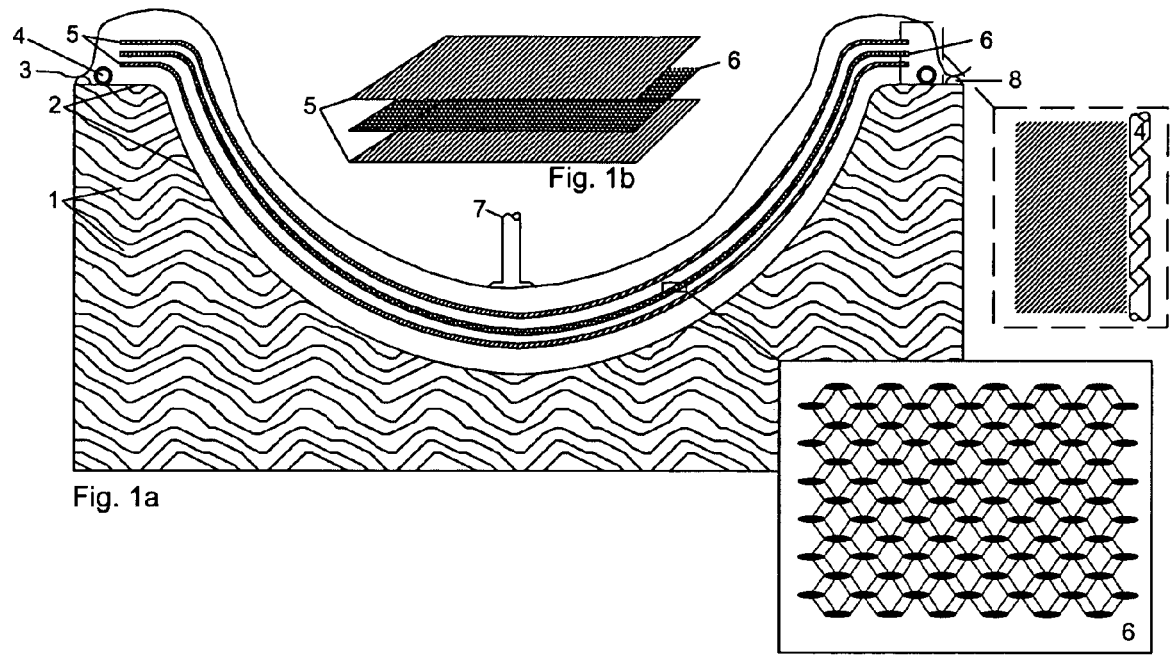
Fig. 1a
Fig. 1b
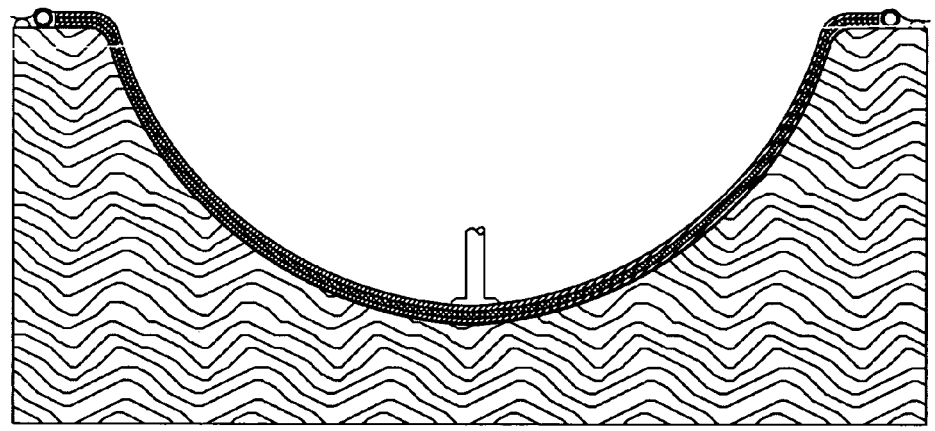
Figure 2

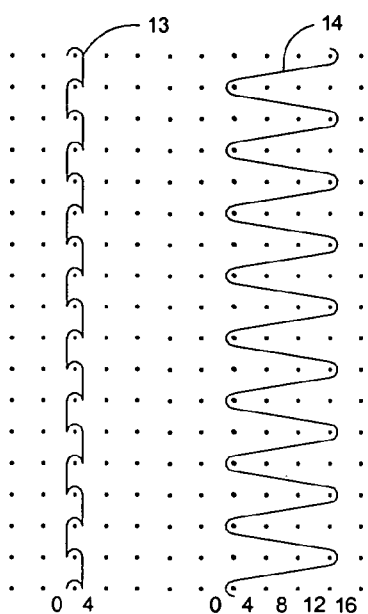
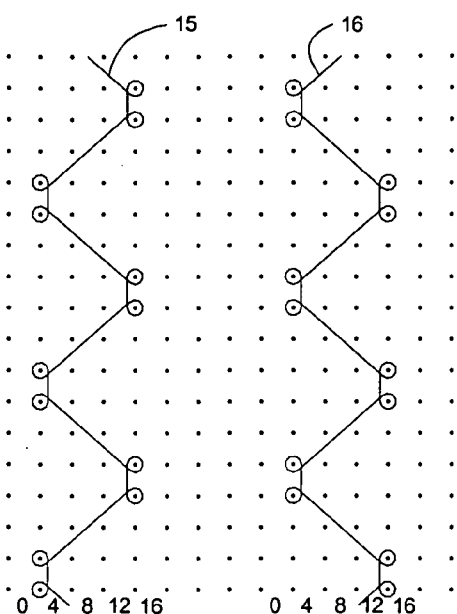
BAR 1  BAR 2  BAR 3  BAR 4
Fig. 5a  Fig. 5b  Fig. 5c  Fig. 5d
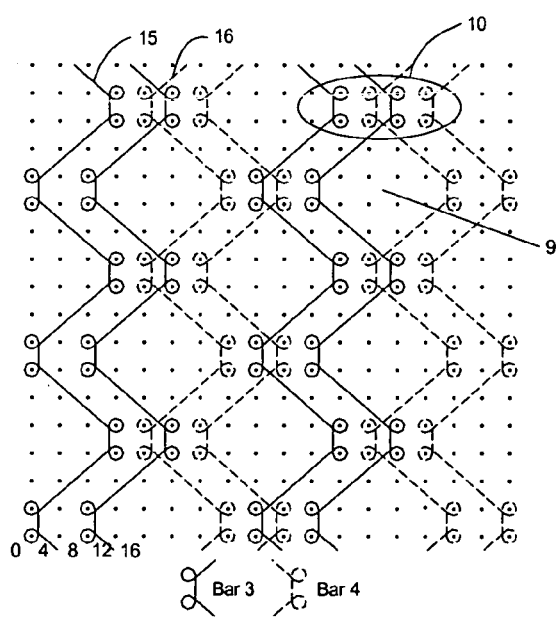
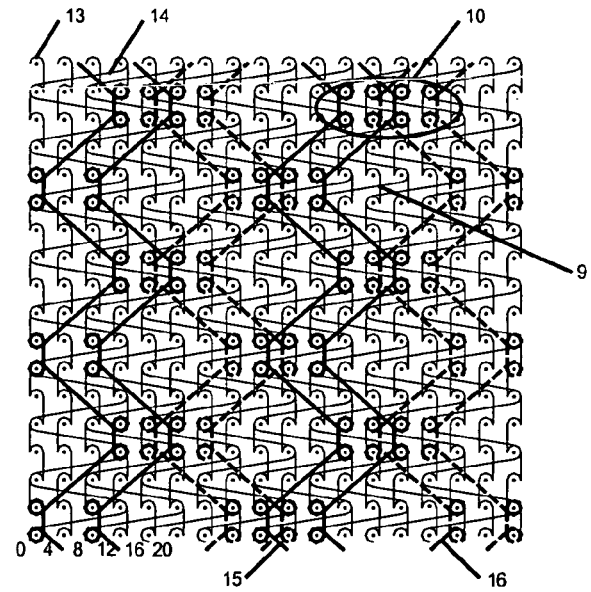
Fig. 5e  Fig. 5f

| Fig. 6a | Fig. 6b | Fig. 6c | Fig. 6d |
|---------|---------|---------|---------|
| BAR 1 | BAR 2 | BAR 3 | BAR 4 |

OPEN-WORK KNITTED TEXTILE RESIN INFUSION MEDIUM AND REINFORCING COMPOSITE LAMINA

CROSS REFERENCE TO RELATED APPLICATIONS

This application claims priority of Provisional application Ser. No. 60/493,639, filed on Aug. 11, 2003, and is a continuation in part of U.S. Ser. No. 10/914,931, filed Aug. 10, 2004, the entire disclosures of which are incorporated herein by reference.

FIELD OF THE INVENTION

The present invention relates to a resin infusion medium and reinforcing composite lamina consisting of open-work knit textile articles produced on a warp knitting machine.

BACKGROUND OF THE INVENTION

Fiber reinforced resin composite structures are used in various industries, including the manufacture of parts and finished goods in automotive, recreation vehicle, trucking, aerospace, marine, rail, appliance, athletic equipment, container, construction, anti-corrosion, electrical and medical industries. There are several generally known technical approaches to the forming of fiber reinforced laminate composites.

Closed molding has existed for many years but is gaining wider adoption as manufacturers seek to reliably produce high-volume, high quality parts, yet simultaneously reduce emissions of hazardous air pollutants. In closed mold processing, fiber and/or other reinforcement(s), collectively referred to as the "pre-form," are cut to fit and then placed in the two-part mold. A method of enclosing and compressing the pre-form against the mold is then employed. The resin is then typically introduced into the pre-form via ports through the enclosure. Upon curing of the resin, the mold enclosure member is first removed, followed by the finished part.

Of the available closed mold processes, vacuum infusion is perhaps-the easiest to use and provides engineers with an arsenal of design options to attain many benefits over other processing methods (e.g. lamination, also known as open molding) including: improved performance-to-weight, higher fiber volume ratios and efficient structural designs; reduced cost through fewer parts and production steps, efficiency of material and labor use, and simplification and standardization manufacturing methods; improved structural properties and longevity, reduced fatigue properties in structural laminate, smoother ply drop transitions and processes that increase reliability of fiber placement, orientation, and laminate composition.

There are two basic vacuum infusion techniques, surface infusion and interlaminar infusion. In surface infusion, before applying the flexible bag or membrane a disposable barrier layer, commonly referred to as a peel ply, is placed on top of the laminae pre-form. A disposable infusion medium with rigid open structures that do not buckle under vacuum and/or perforated injection tubing is then placed on top of the peel ply to aid in the delivery and distribution of the liquid resin down through the laminae stack. In the case of a reusable vacuum bag or membrane the distribution channels may be incorporated into the bag. Vacuum pressure is then applied to draw resin through feed-lines into the mold and through the fiber pre-form. This technique is commonly referred to as surface vacuum infusion processing since the resin is introduced at the top surface of the laminae assembly. Examples are described in Seemann et. al. U.S. Pat. Nos. 4,902,215, 5,052,906 and 5,601,852. The greatest drawback of surface infusion is the high waste and non-profit stream costs due to the disposal of peel plies and surface infusion medium. Other drawbacks include steep implementation learning curves and increased complexity with increases in part size. Further drawbacks will be recognized by those fluent in the art.

In interlaminar infusion the infusion medium is integrated with other laminae in the ply stacking sequence of the laminae pre-form. There are numerous advantages to interlaminar infusion processing over surface infusion processing other than waste and cost reduction. Surface infusion is a one-sided process in which the resin flows from the top down through the laminae stack. Interlaminar infusion medium can be sandwiched and/or placed on either face to promote infusion on all sides of the dry laminae, greatly speeding infusion. Further, since the composite becomes the infusion pathway, placement of vacuum and resin feed lines is greatly simplified. Those fluent in the art will recognize the maintenance of medium porosity under vacuum induced compression as prerequisite to flow efficacy.

SUMMARY OF THE INVENTION

A new type of resin infusion medium and reinforcing composite lamina textile has been invented, and is the primary subject of the present invention. The textile comprises a warp knit open work structure preferably produced in an approximately polygonal form, of which at least some of the edges of the polygons are defined by knops such as to give prominence to the design to provide for fluidic channels, with three dimensional fluid flow with preferential flow in the weft direction. The knops are knitted to be sufficiently non-compressible in order to resist collapse of the fluid channels during compression of the composite preform under vacuum induced process pressure.

The present invention relates generally to a resin infusion medium textile for closed molded resin infusion molding for the production of fiber reinforced resin plastic (composite) structures.

More specifically this invention relates to a new type of resin infusion medium and reinforcing composite lamina constituted by a warp knit open work textile; wherein the open mesh, foraminous textile structure has a dominant apertured construction wherein the fiber or yarn components occupy substantially less volume than the apertured voids of the textile material; and wherein the apertured construction is defined by polygons of which at least some of the edges are defined by knops such as to give a third dimensional prominence of periodically raised or ribbed members to the design to provide for bilateral (e.g. warp and weft) fluidic channels, the knops being knitted to be sufficiently non-compressible in order to resist collapse of the fluid channels during compression of the composite preform under vacuum induced process pressure; and wherein an appropriate ratio of holes are located in the fabric as selected for the desired axial fluid flow (i.e. perpendicular to the warp/weft plane of the textile) by and within the skill of the practitioner of this invention. The resulting fiber reinforced plastics may form part of or all of the composite laminate.

In these respects, the use of the inventive open work textile interlaminar infusion medium and reinforcing composite lamina to aid in the transfer, delivery and distribution of resin according to the present invention substantially departs from the conventional concepts and designs of the prior art. In so doing, the invention provides a technique and use of a material that increases the resin distribution rate and uniformity throughout the laminae pre-form. Additionally, the capability to custom design the interlaminar medium according to the teachings herein provides a vast spectrum of options with which one skilled in the art can enhance process performance and the physical properties of the composite.

Thus, in seeking to improve over the foregoing disadvantages inherent in the known types of resin infusion techniques now present in the prior art, the present invention provides a new technique for resin infusion through the novel use of an new open work textile interlaminar resin infusion medium and reinforcing composite lamina in the preform lay up.

Accordingly, a general purpose and objective of the present invention is to employ an open work textile, discussed above, for the resin infusion medium and reinforcing composite lamina, while retaining the other advantages of the resin infusion techniques, as mentioned above.

Further, since the open work textile of the invention can be sandwiched either in the middle and/or placed on either or both sides of the laminate schedule, it can be utilized either as an interlaminar infusion medium, or alternatively as the last or top ply of the laminate stack, thus serving as a surface infusion medium.

The invention may be applied to the production of composite parts and/or finished goods for use in the automotive, recreation vehicle, trucking, aerospace, marine, rail, appliance, athletic equipment, container, construction, anti-corrosion, electrical and medical industries, among others.

This invention features an open-work textile for use as a resin infusion medium, comprising an open-work fabric defining resin flow channels in both dimensions in the warp-weft plane of the fabric and also in a third dimension through the thickness of the fabric; and a plurality of spaced projecting knops integrally formed in the fabric that create a preferential resin flow in the weft direction of the fabric. At least some of the knops are preferably elongated, and these may be elongated in the weft direction. At least some of the knops may be arranged in rows along the weft direction, and the knops comprising the rows in the weft direction are preferably spaced from one another. The spacing may be essentially regular. The knops in adjacent rows are preferably offset from one another in the warp direction. The spacing between the knops in the rows in the weft direction may be approximately the same as the length of the knops in the weft direction.

The knops may be regularly spaced in at least one dimension, and may be regularly spaced in both the warp and weft directions. The knops may be arranged in rows along the weft direction. The knops in adjacent rows may be offset from one another in the warp direction. At least some of the knops may be formed by knitting together at least two yarns of different decitex values. One yarn may have a decitex value which is at least about five times that of another yarn comprising the knop. At least portions of some of the knops may be formed by knitting together three yarns, two of which are of substantially greater decitex values than the third yarn. In a specific embodiment, one yarn may be about 140 decitex and two other yarns may be about 1100 decitex, and the three yarns may be of non-texturized polyester.

The open-work textile may be warp knit. The textile may comprise open stitched and inlaid yarns with relatively low decitex values, and two knop stitched yarns with substantially greater decitex values. The textile may be heat set after knitting. The textile may have a finished weight of about 380 grams per square meter. The textile may define at least about 70% void volume. The textile may define a plurality of relatively open resin flow paths in the weft direction, and a plurality of less open flow paths in the warp direction. The weft direction flow paths may comprise adjacent weft-direction courses without knops in the courses. The warp direction flow paths may comprise adjacent warp-direction wales having knops spaced along and within the wales. The knops may be elongated in the weft direction.

The open-work textile may further comprise a fibrous lamina layer on at least one face of the textile. The knops may define edges of generally polygonal shapes formed by knop knit high decitex fibers. The polygonal shapes may be generally hexagonal. The generally hexagonal shapes may be essentially space filling in a honeycomb pattern.

To further illustrate the invention in certain useful but non-limiting embodiments, reference is made to the accompanying drawings.

BRIEF DESCRIPTION OF THE DRAWINGS

Other objects, features and advantages will occur to those skilled in the art from the following description of the preferred embodiments and the accompanying drawings in which:

FIG. 1a is a cross sectional view, and FIG. 1b a partial exploded top view, of a typical vacuum infusion mold assembly comprised of a rigid mold and a flexible bag or membrane disposed thereon, but with an open-work textile resin infusion medium of the invention and reinforcing composite lamina placed in the laminate, or ply stacking sequence;

FIG. 2 shows FIG. 1a with vacuum applied, and thus with the fabric laminae compressed in the mold;

FIGS. 5a-f diagrammatically show the lapping motions of the preferred embodiment of the inventive open-work warp knit fabric; and FIGS. 6a-f diagrammatically show the lapping motions of an alternative embodiment of the inventive open-work warp knit fabric.

DETAILED DESCRIPTION OF THE PREFERRED EMBODIMENTS OF THE INVENTION

Figure 3:
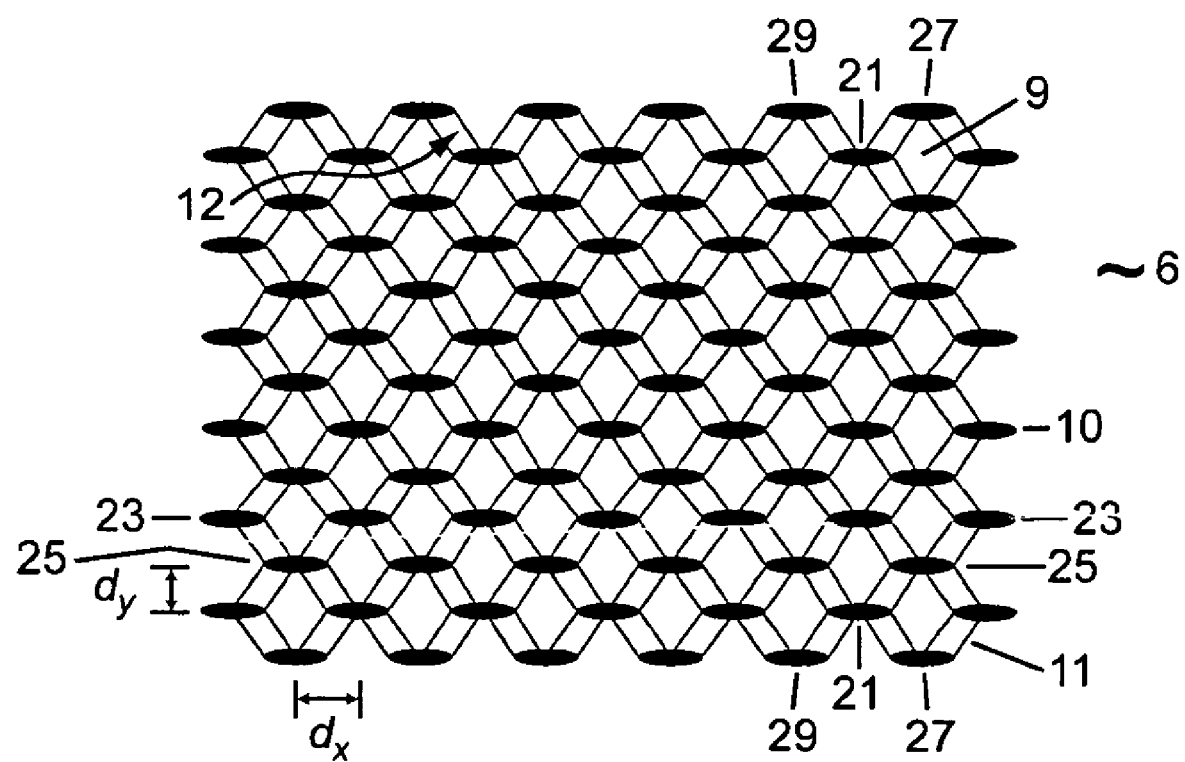
FIG. 3 diagrammatically illustrates in plan view the general construction of a preferred embodiment of an open-work textile of the invention.

In the drawings, FIG. 1a is a cross sectional view of a typical vacuum infusion mold assembly comprised of one rigid mold 1 having a shaped mold surface or face 2 and one flexible bag or membrane 3, but with an open-work textile resin infusion medium of the invention employed, and reinforcing composite lamina placed in the laminate, or ply stacking sequence. The vacuum bag 3 is placed over the open mold, and is associated with the perforated resin infusion tubing 4 (shown in cross sectional and top plan views). The laminate layup is composed of fibrous lamina 5, an open-work textile layer 6 (also shown in top plan view), and a vacuum tubing inlet 7, and with a sealant tape 8.

Dry fiber reinforcement is laid into a mold 1 of the desired shape. In this example, the open-work textile 6 is placed between two layers of fiber reinforcement or lamina 5 to make up the laminae. A flexible sheet of plastic 3 is placed over the mold and laminate. The edges of the sheet are sealed against the mold, in this example with sealant tape 8 to form a sealed envelope surrounding the laminate. Vacuum pressure is then drawn through one or more strategically located ports 7 in the mold or plastic cover to collapse the flexible sheet against the reinforcement. The vacuum serves to shape the fibers to the mold, provide consolidation of the fibers via atmospheric pressure, and to remove any entrapped air, as shown in FIG. 2. Resin is then introduced into the envelope via perforated feed-lines, in this example spiral wrap 4 is used, and the vacuum serves to draw the resin through the fiber pre-form via the paths afforded by the open-work textile. Vacuum pressure is maintained until the laminate is fully saturated with resin and subsequently cures.

FIG. 2 illustrates the configuration of the device of FIG. 1 with the vacuum applied and resultant compression of the layup.

FIG. 3 diagrammatically shows in top plan view the general construction of a suitable fabric for use as the open-work textile resin infusion medium and reinforcing composite lamina 6. The fabric depicted in FIG. 3 is a bilateral fabric. As used herein, the term "bilateral" is construed to mean a fabric that defines fluid flow paths in both the longitudinal (i.e., "warp" or "machine") direction and the transverse (i.e., "weft" or "cross-machine") direction of the fabric.

Thus, the fabric illustrated in FIG. 3 is bilateral in that it the open-work apertured voids 9 of the structure are defined in form by a plurality of generally polygonal forms of which at least some of the edges are defined by knops 10 that give a third dimensional prominence of periodically raised or ribbed members to the design, the remaining edges 12 of the polygonal forms being comprised of fiber strands 11 therebetween. The fibers comprising the knops 10 can include fibers formed from various materials such as natural materials (e.g. cotton, flax, etc.), polymeric materials (e.g. polyesters, polyamides, etc.), inorganic materials (e.g. glass fibers, carbon fibers, etc.), and combinations thereof.

The plurality of knops are spaced apart by a distances, $d_x$ and $d_y$, where distance $d_x$ is dependant upon the gauge of machine on which the fabric is knitted, the size of the yarns making up the fabric, and the knit structure and where $d_y$ is dependant upon the selected course count.

The appropriate ratio of holes are located in the fabric as selected for the desired axial fluidic flow (i.e. perpendicular to the warp/weft plane) by and within the skill of the practitioner of this invention. The resulting fiber reinforced plastics may form part of or all of the composite laminate.

Open work textile. 6 defines resin flow channels in both dimensions in the warp-weft plane of the fabric, and also in a third dimension through the thickness of the fabric. A plurality of spaced projecting knops 10 integrally formed in fabric 6 create a preferential resin flow in the weft direction of the fabric. In the embodiment shown in FIG. 3, for example, knops 10 are arranged in rows along the weft direction, for example adjacent rows 23 and 25. In this embodiment, each individual knop 10 is elongated in the weft direction, although such is not a limitation of the invention. The knops 10 that define each such row are spaced from one another. In this embodiment, the spacing between knops in a row is approximately the same as the length of the knops, to define regularly spaced knops. Because fiber strands 11 that interconnect the knops in the generally polygonal (hexagonal) fashion as shown in the drawing are defined in this case by two spaced parallel fibers rather than a knop, these sides 11 of the polygons are more open than are knops 10. Further, the central area 9 of these generally polygonal shapes is even more open, as is apparent from FIG. 5f. The result is that a relatively unrestricted flow path in the weft direction between adjacent rows 23 and 25 of knops 10 is defined in textile 6.

Knops 10 defining adjacent rows 23 and 25 are offset from one another in the warp direction. The result of this is that the rows in the warp direction such as three adjacent rows 27, 21 and 29 define therebetween flow paths that are not as open as the flow paths in the weft direction. The flow in the warp direction is constrained to be more circuitous because each path in the warp direction is effectively blocked at spaced intervals by the spaced series of knops 10. This causes the preferential flow in the weft direction, while allowing flow in both the weft and warp directions.

Figure 4:
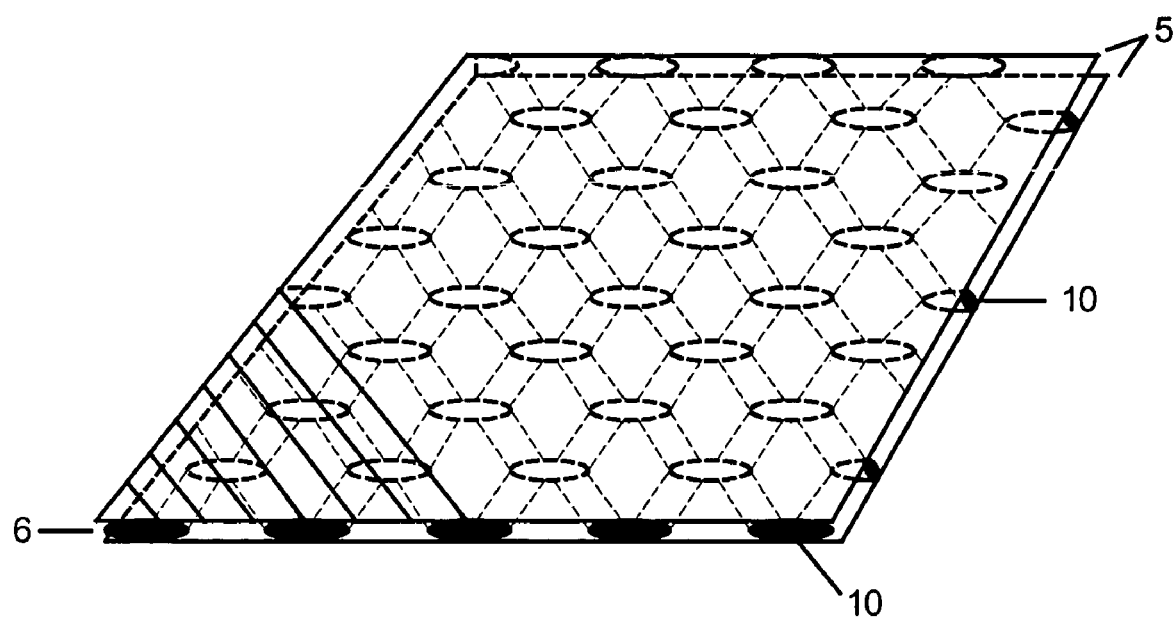
FIG. 4 diagrammatically illustrates a cross section of the open work textile shown in FIG. 3, along with cover fibrous laminae.

FIG. 4 is a cross section of the fabric of FIG. 3 but in which fabric 6 is applied as in FIGS. 1 and 2, and where fibrous lamina 5 are present on both sides of open-work textile 6, under vacuum. In use the ribbed textile surface 6 is arranged in face-to-face contact with the adjacent lamina of the preform, 5. In one preferred embodiment of this invention the open work textile is constructed such that open paths are maintained within said open-work textile in both the weft and warp directions by knops 10 when subjected to vacuum compression thereby permitting the resin to flow freely throughout said laminae. This quality can be imparted to the fabric 6 through the selected construction technique, construction architecture, construction material, stabilizing coatings or sizings, or a combination thereof as described herein.

It will also be appreciate that a desired laminate stack may have more than one ply of the open-work textile, placed within or on an outer surface of the stack with a plurality of conventional textiles plies suitably arranged on either side thereof.

For instance, for the one or more lamina other than the open-work textile, there may be used unidirectional fabrics of various construction, woven or knit fabrics, multiaxial fabrics of stitched construction, or braided fabrics. Fiber types used therein may also be of various compositions, including organic, such as, polyester, aramid (i.e. Kevlar, or Nomex), etc., or carbon fibers, or inorganic, such as glass or ceramic.

FIGS. 5a-f are warp knit guide bar-lapping diagrams with point paper notations (the needle heads being represented as dots) of the preferred embodiment of the inventive knopped open work textile 6, as explained further below.

FIGS. 6a-f are warp knit guide bar-lapping diagrams with point paper notations (the needle heads being represented as dots) of another example of a suitable knopped open work textile 6, as explained further below.

NON-LIMITING EXAMPLES OF THE INVENTION

Example 1

The following is an example of the practiced invention utilizing a warp knit open-work knop textile architecture, an example of which is shown diagrammatically in FIG. 3 (6).

As indicated above, one form of the open-work textile 6 may be a warp knit fabric wherein the open mesh has a dominant apertured construction defined in form by polygons of which at least some of the edges are defined by knops such as to give a third dimensional prominence of periodically raised or ribbed members.

The plurality of knops are spaced apart by a distances, $d_x$ and $d_y$ (see FIG. 3), where distance $d_x$ is dependant upon the gauge of machine on which the fabric is knitted, the size of the yarns making up the fabric, and the knit structure and where $d_y$ is dependant upon the selected course count. These spacings are thus design choices.

In use the knopped open-work textile surface 6 is arranged in face-to-face contact with the adjacent lamina of the preform, 5. The knops are knitted to be sufficiently non-compressible in order to resist collapse of the fluid channels defined within the textile during compression of the composite preform under vacuum induced pressure. In this manner rapid transport of the resin is affected during resin infusion.

Further to the example, FIGS. 5a-f are warp knit guide bar-lapping diagrams with point paper notations (the needle heads being represented as dots) of a said suitable open-work textile 6. The lapping motion of a suitable ground mesh is shown in FIG. 5a and FIG. 5b where FIG. 5a Guide Bar 1 is shown to undergo a 0-4/4-0 repeat motion in order to create an open chain stitch defined by yarn 13 as link in by weft yarn 14 which undergo a 0-0/16-16 repeat motion in order to create an inlay over 4 needles as shown in FIG. 5b Guide Bar 2. Typically Bar 1 is fully threaded (full set) at typically one end per guide although it is envisaged that Bar 1 may be partially threaded. Typically Bar 2 is half set (one in-one out) at typically one end per guide but may be fully threaded or otherwise partially threaded. Typically the yarn for 13 and 14 is about 140 decitex non-texturized, preferably high tenacity polyester, but could be any one of the contemplated yarns or combinations thereof. Likewise, yarn 13 and 14 need not be the same.

The lapping motion for a suitable knop stitch is shown in FIGS. 5c and 5d. FIG. 5c Bar 3 is shown to work according to the following weave: 4-4/4-0/4-0/4-4/12-16/12-16 and is threaded at two ends per guide, one in, one out, one in, five out repeat. FIG. 5d Bar 4 is shown to working according to the follow weave: 4-4/12-16/12-16/4-4/4-0/4-0 and is threaded at two ends per guide, four out then one in, one out, one in, five out, repeat. In order to render the knops 10 resistive to compressive deformation, and thereby resist collapse of the warp and weft fluidic flow paths, a relatively inextensible yarn 15 and 16 is chosen and the stitches making up respective knops 10 are knitted sufficiently tightly. Typically the knop yarn 15 and 16 is about 1100 decitex non-texturized, preferably high tenacity polyester, but could be any one of the contemplated yarns or combinations thereof. Likewise, yarn 15 and 16 need not be the same.

The timing of the lapping motion of Bar 3 and Bar 4 is shown in FIG. 5e. The interlacing of the knop laps of Bar 4 with Bar 3, as shown, serves to increase the knop prominence and is the preferred embodiment of the inventive textile.

FIG. 5f shows the lapping motion Bars 1 through 4. The resulting textile is preferably heat set after knitting in order to remove lubricants, conditioners, etc from the yarn. The heating is preferably performed on tenters disposed lengthwise such as to affix the machine state weft dimension during the setting process. Articles thus obtained show excellent stability whereas the starting knitted fabric is in itself somewhat deformable. The textile may also be finished with a form of resin coating, such as an acrylic, that acts to further stabilize the open-work architecture from deformation during application and processing.

Further to the example Table 1 below details the knitting specification and resulting textile per the example presented in FIGS. 5a-f.

TABLE 1

| Style Reference | CFL/SBR70/3 | Courses per Meter | 1260 |
|---|---|---|---|
| Machine Reference | Karl Mayer RM6 | Finishing Specification | 220° C. at 20 meters per minute throughput |
| Machine Type | 12 Gauge Raschel | Finished Weight | 377 grams per square meter |

| | | | Construction (One Needle Increment is 0-4) | | | |
|---|---|---|---|---|---|---|
| Bar | Yarn | Ends Per Guide | Guide Threading | Feed Rate (mm/rack) | Patterning Description | Chain Details |
| 1 | 140 dtex f30 polyester Setila T1716 | 1 | Full Set | 2174 | Open Chain Stitch | 0-4/4-0 |
| 2 | 140 dtex f30 polyester Setila T1716 | 1 | Half Set | 3118 | Inlay Over Four Needles | 0-0/16-16 |
| 3 | 1100 dtex f210 Z130 Polyester Acordis Diolen 174S | 2 | 1 in, 1 out, 1 in, 5 out, Repeat | 1984 | Knop Stitch | 4-4/4-0/4-0/4-4/12-16/12-16 |
| 4 | 1100 dtex f210 Z130 Polyester Acordis Diolen 174S | 2 | 4 out then 1 in, 1 out, 1 in, 5 out, Repeat | 1984 | Knop Stitch | 4-4/12-16/12-16/4-4/4-0/4-0 |

Example 2

The warp knit guide bar-lapping diagrams of another non-limiting example of an open-work textile 6 of the present invention are shown in FIGS. 6a-f.

The lapping motion of the ground mesh is shown in FIG. 6a and FIG. 6b where FIG. 6a Guide Bar 1 is shown to undergo a 0-4/4-0 repeat motion in order to create an open chain stitch defined by yarn 13 as link in by weft yarn 14 which undergo a 0-0/16-16 repeat motion in order to create an inlay over 4 needles as shown in FIG. 6b Guide Bar 2. The lapping motion for a suitable knop stitch is shown in FIGS. 6c and 6d. FIG. 6c Bar 3 is shown to work according to the following weave: 4-4/4-0/4-0/4-4/8-12/8-12 and is threaded at two ends per guide, two in, six out repeat. FIG. 6d Bar 4 is shown working according to the follow weave: 4-4/8-12/8-12/4-4/4-0/4-0 and is threaded at two ends per guide, four out then two in, six out, repeat.

Figure 6E:
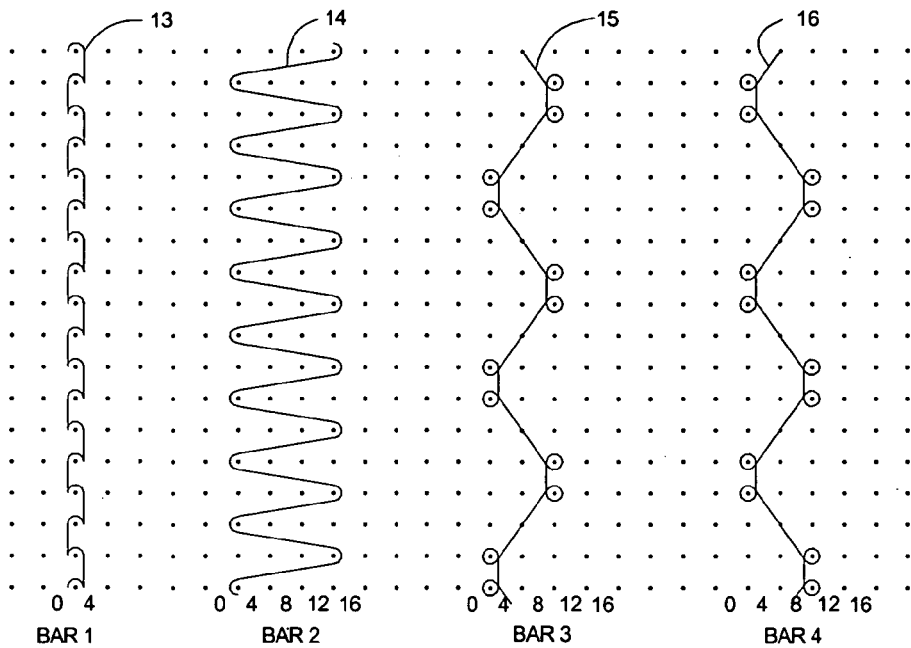
Figure 6E:
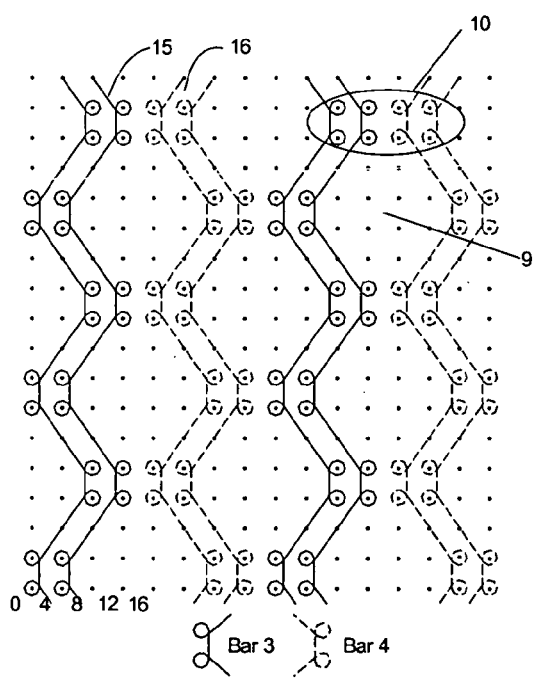

The timing of the lapping motion of Bar 3 and Bar 4 is shown in FIG. 6e.

Figure 6F:
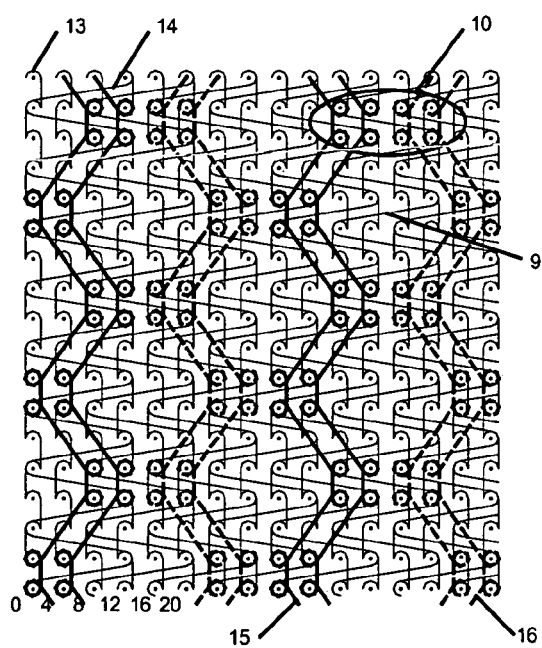

FIG. 6f shows the lapping motion Bars 1 through 4. The resulting textile is preferably heat set after knitting in order to remove lubricants, conditioners, etc from the yarn.

Further to the example Table 2 below details the knitting specification and resulting textile per the example presented in FIGS. 6a-f.

TABLE 2

| Style Reference | CFL/SBR70/2 | Courses per Meter | 1181 |
|---|---|---|---|
| Machine Reference | Karl Mayer RM6 | Finishing Specification | 190° C. at 20 meters per minute throughput |
| Machine Type | 12 Gauge Raschel | Finished Weight | 381 grams per square meter |

Construction
(One Needle Increment is 0-4)

| Bar | Yarn | Ends Per Guide | Guide Threading | Feed Rate (mm/rack) | Patterning Description | Chain Details |
|---|---|---|---|---|---|---|
| 1 | 140 dtex f30 polyester Setila T1716 | 1 | Full Set | 2174 | Open Chain Stitch | 0-4/4-0 |
| 2 | 140 dtex f30 polyester Setila T1716 | 1 | Half Set | 3348 | Inlay Over Four Needles | 0-0/16-16 |
| 3 | 1100 dtex f210 Z130 Polyester Acordis Diolen 174S | 2 | 2 in, 6 out, Repeat | 2044 | Knop Stitch | 4-4/4-0/4-0/4-4/8-12/8-12 |
| 4 | 1100 dtex f210 Z130 Polyester Acordis Diolen 174S | 2 | 4 out then 2 in, 6 out, Repeat | 2044 | Knop Stitch | 4-4/8-12/8-12/4-4/4-0/4-0 |

The manner of usage and operation of the present invention, and variations and equivalents thereof, will be apparent to those skilled in the art from the above description, and it will be recognized that a wide variety of specific practices may be employed.

With respect to the above description and example, it is also to be recognized that the optimum dimensional relationships for the parts of the invention, may include variations in size, materials, shape, form, function and manner of operation, assembly and use.

Obviously, the invention is not limited to the examples given hereinabove and on the contrary covers any variants thereof which remain with its scope or its spirit.

For example, although in the described example the knitted fabric is obtained on a one-needle bar Raschel machine, it could also be possible to produce tubular knitted fabrics on a two needle bar Raschel machines, the resulting article being either used in its tubular shape, or optionally cut along a generating line, to double the width of the finished article.

Also, the articles according to the invention could also be produced on any other warp knit machines such as warp looms or crocheting machines.

It is further possible, by combining different stitches, to obtain open-work with interstices shaped differently one from the other, alternating for example diamond and hexagonal shapes.

Therefore, the foregoing specific working embodiments are considered as illustrative only of the principles of the invention. Further, since numerous modifications and changes thereto may be made by those skilled in the art, without departing from the spirit of this invention, which is limited only by the scope of the following claims.

What is claimed is:

1. An open weave textile for use as a resin-infusion medium comprising:
   a ground mesh knitted from yarns having a relatively low decitex value, the ground mesh defining a substantially horizontal plane and further defining warp and weft directions within the horizontal plane;
   knop-forming yarns having a higher decitex value than the ground mesh yarns;
   where the knop-forming yarns are knitted into the ground mesh in such a manner as to form sides and vertices of a series of features that, when viewed looking down onto the ground mesh plane, define generally polygonal shapes interconnected to and above the ground mesh;
   where the vertices of the polygonal-shaped features are created by knops formed by a series of interconnected knop stitches of the knop-forming yarns, the sides of the polygonal-shaped features are formed by the knop-forming yarn without knop stitches, and each polygonal-shaped feature has an open central area; and
   where the knops restrict resin flow more than do the sides of the polygonal-shaped features, to create a preferential resin flow path in one of the warp or weft directions.

2. The open-work textile of claim 1, where the polygonal-shaped features are diamond-shaped when viewed looking down onto the ground mesh plane.

3. The open-work textile of claim 1, where the polygonal-shaped features are hexagonal-shaped when viewed looking down onto the ground mesh plane.

4. The open-work textile of claim 1, where at least some of the knops are elongated.

5. The open-work textile of claim 4, where the elongated knops are elongated in one of the warp or weft direction.

6. The open-work textile of claim 1, where the knops are regularly spaced from one another in one of the warp or weft directions.

7. The open-work textile of claim 1, where the knops are regularly spaced from one another in both the warp and weft directions.

8. The open-work textile of claim 1, where the knop-forming yarns have a decitex value that is at least five times that of the ground mesh yarns.

9. The open-work textile of claim 1, where the ground mesh yarns have a decitex value of approximately 140 decitex and the knop-forming yarns have a decitex value of approximately 1100 decitex.

10. The open-work textile of claim 1, where the textile defines at least 70% void volume.

11. The open-work textile of claim 1, where the knops are arranged in rows along the weft direction and the knops in adjacent rows are offset from one another in the warp direction to create a preferential resin flow path in the weft direction.

12. The open-work textile of claim 1, where the knops are arranged in rows along the warp direction and the knops in adjacent rows are offset from one another in the weft direction to create a preferential resin flow path in the warp direction.

13. The open-work textile of claim 1, further comprising a fibrous lamina layer on at least one face of the textile.

14. An open weave textile for use as a resin-infusion medium comprising:
   a ground mesh knitted from yarns having a relatively low decitex value, the ground mesh defining a substantially horizontal plane and further defining warp and weft directions within the horizontal plane;
   knop-forming yarns having a decitex value that is at least five times that of the ground mesh yarns;
   where the knop-forming yarns are knitted into the ground mesh in such a manner as to form sides and vertices of a series of features that, when viewed looking down onto the ground mesh plane, define generally polygonal shapes interconnected to and above the ground mesh;
   where the vertices of the polygonal-shaped features are created by elongated, regularly-spaced knops formed by a series of interconnected knop stitches of the knop-forming yarns, the sides of the polygonal-shaped features are formed by the knop-forming yarn without knop stitches, and each polygonal-shaped feature has an open central area; and
   where the knops restrict resin flow more than do the sides of the polygonal-shaped features, to create a preferential resin flow path in one of the warp or weft directions.

15. The open weave textile of claim 14, where the ground mesh yarns have a decitex value of approximately 140 decitex and the knop-forming yarns have a decitex value of approximately 1100 decitex.

16. The open-work textile of claim 14, where the knops are arranged in rows along the weft direction and the knops in adjacent rows are offset from one another in the warp direction to create a preferential resin flow path in the weft direction.

17. The open-work textile of claim 14, where the knops are arranged in rows along the warp direction and the knops in adjacent rows are offset from one another in the weft direction to create a preferential resin flow path in the warp direction.

18. An assembly for use in a resin infusion molding process for making a fiber-reinforced composite laminate, comprising:
   a stack comprising at least two plies of textile material,
   where at least one ply is a layer of an open weave textile comprising a ground mesh knitted from yarns having a relatively low decitex value, the ground mesh defining a substantially horizontal plane and further defining warp and weft directions in the horizontal plane, and knop-forming yarns having a higher decitex value than the ground mesh yarns,
   where the knop-forming yarns are knitted into the ground mesh in such a manner as to form sides and vertices of a series of features that, when viewed looking down onto the ground mesh plane, define generally polygonal shapes interconnected to and above the ground mesh, and
   where the vertices of the polygonal-shaped features are created by knops formed by a series of interconnected knop stitches of the knop-forming yarns, the sides of the polygonal-shaped features are formed by the knop-forming yarn without knop stitches, and each polygonal-shaped feature has an open central area, and
   where the knops restrict resin flow more than do the sides of the polygonal-shaped features, to create a preferential resin flow path in one of the warp or weft directions, and where at least one ply is a layer of fiber reinforcement;
   a substantially air-impervious envelope enclosing the stack;
   where the envelope is configured to allow a vacuum to be drawn within the envelope and a liquid resin to be introduced into the envelope, the resin distribution within the stack being aided by the open weave textile, where the resin saturates the stack and then cures, to embed the stack in the cured resin and thereby form the fiber-reinforced composite lamina.

19. The assembly of claim 18, where the knop-forming yarns have a decitex value that is at least five times that of the ground mesh yarns.

20. The assembly of claim 18, where the knops are elongated and regularly spaced from one another in one of the warp or weft directions.

* * * * *